United States Patent [19]

Mahr et al.

[11] 4,416,749

[45] Nov. 22, 1983

[54] CROSSLINKED ETHYLENE/VINYL ACETATE COPOLYMER FILM AND PROCESS FOR TREATING SAME

[75] Inventors: Tibor G. Mahr; Pallatheri M. Subramanian, both of Wilmington, Del.

[73] Assignee: E. I. Du Pont de Nemours & Co., Wilmington, Del.

[21] Appl. No.: 413,214

[22] Filed: Aug. 30, 1982

Related U.S. Application Data

[62] Division of Ser. No. 259,422, May 1, 1981, Pat. No. 4,370,212.

[51] Int. Cl.$^3$ .................. B32B 27/30; C08F 8/12
[52] U.S. Cl. .................. 204/159.14; 264/22; 428/409; 428/522; 525/60; 525/62
[58] Field of Search ............. 525/60, 62; 204/159.14; 264/22; 428/409

[56] References Cited

U.S. PATENT DOCUMENTS

| | | | |
|---|---|---|---|
| 3,160,575 | 12/1964 | Bartl et al. | 204/154 |
| 3,391,129 | 7/1968 | Sparks | 260/86.7 |
| 3,547,858 | 12/1970 | Worrall | 260/87.3 |
| 3,809,671 | 5/1974 | Okawa et al. | 260/41 R |
| 4,078,128 | 3/1978 | Hoyt et al. | 526/10 |
| 4,122,062 | 10/1978 | Monte et al. | 260/42.14 |
| 4,137,364 | 1/1979 | Ball et al. | 428/412 |
| 4,170,690 | 10/1979 | Armbruster et al. | 428/447 |
| 4,177,315 | 12/1979 | Ubersax | 428/331 |
| 4,224,262 | 9/1980 | Baird et al. | 264/22 |

FOREIGN PATENT DOCUMENTS

| | | |
|---|---|---|
| 647190 | 8/1962 | Canada . |
| 45-12239 | 5/1970 | Japan . |
| 899774 | 6/1962 | United Kingdom . |

OTHER PUBLICATIONS

Hacks Chemical Dictionary, 4th Edt., McGraw-Hill, 1969, p. 21.

Primary Examiner—Stanford M. Levin

[57] ABSTRACT

A surface treatment for ethylene/vinyl acetate copolymer film resulting in an elastomeric, heat sealable film which retains its transparency after release from 200 percent elongation. The treatment comprises irradiation and controlled surface hydrolysis and, optionally, subsequent attachment of mineral particulates to the surface of the film with or without the use of coupling agents.

10 Claims, No Drawings

CROSSLINKED ETHYLENE/VINYL ACETATE COPOLYMER FILM AND PROCESS FOR TREATING SAME

This is a division of application Ser. No. 259,422, filed May 1, 1981, now U.S. Pat. No. 4,370,212.

BACKGROUND OF THE INVENTION

The subject invention relates to the treatment of copolymer films with a combination of crosslinking and surface treatments to obtain an elastomeric product which will retain its transparency upon relaxation after being stretched, be free of surface tack, and have surface characteristics such that the film displays acceptable heat sealability. Such a product may be used for packaging both food and nonfood items.

The development of copolymer films useful in the packaging industry has been an active area of experimentation for many years. Currently, there are generally two types of films used for packaging purposes. The first is heat-shrinkable film which, due to the temperature required to shrink-wrap such a film around a product, is undesirable for most fruit and vegetable packaging, as well as heat-sensitive nonfood packaging. The second is stretch film such as polyvinylidine chloride which lacks elastomeric properties and hence is not as desirable for packaging as are films which display more acceptable levels of elastic recovery. The object of this invention, therefore, is to devise a process whereby an elastomeric copolymer film can be treated so as to enhance its form stability, while remaining free of surface tack, transparent upon relaxation after being stretched and heat sealable.

It is known that crosslinking molecules of an elastomeric film such as ethylene/vinyl acetate copolymer (hereinafter EVA), containing about 35-50 percent copolymerized vinyl acetate by weight, by exposure to high energy ionizing radiation, results in a film with enhanced form stability, i.e., creep resistance. The crosslinking can be achieved by exposure to high energy radiation such as electrons, X-rays, gamma rays, etc., a dosage of such irradiation being measured in "rads" wherein one rad is the absorbed dose of ionizing radiation equal to an energy of 100 ergs per gram of irradiated material. A megarad (MR) is equal to one million rads. Crosslinked EVA displaying such form stability, however, is not satisfactory for stretchable film packaging due to excess surface tack which creates handling problems both in production windup and machine packaging applications.

The problem of surface tack associated with EVA has also been addressed by prior teachings. It is known that hydrolysis of EVA pellets render the pellets nonagglomerizable. It is also known that hydrolysis of the suurface of EVA film removes the undesirable surface tack. However, hydrolysis of EVA referred to in prior teachings is carried out to such an extent that both elasticity and transparency after stretching would be lost from EVA in a film form.

Further, the combination of crosslinking EVA by irradiation techniques followed by hydrolysis with subsequent film formation has recently been addressed in U.S. Pat. No. 4,224,262 on the application of Baird et al. There the object of the invention was to produce a packaging film that would not be deleteriously affected by moisture and would, at the same time, serve as a barrier to oxygen permeation. To accomplish this objective, Baird et al. irradiated EVA copolymer containing 45 percent vinyl acetate by weight of the copolymer and subsequently carried out greater than 96 percent hydrolysis of the copolymer. A resin was recovered and pressed into a film of a crosslinked copolymer of an olefin and a vinyl alcohol. Because of the high degree of hydrolysis present throughout the thickness of the film, a total loss of elasticity is observed.

SUMMARY OF THE INVENTION

It has been found that when EVA, with polymerized vinyl acetate content about 35-50 percent by weight of the copolymer, is irradiated and subsequently hydrolyzed or alcoholyzed under carefully controlled conditions, that a resulting film exhibits greater form stability, greater impact strength, retains more than 85 percent elastic recovery after 200 percent elongation, retains its transparency upon relaxation after being stretched, and exhibits good heat sealability, the latter measured by heat sealing two films together at 100°-200° C. for 3 seconds at 15 psi, ($1 \times 10^5$ Pa) then measuring the force needed to peel the two films apart. For purposes of this invention, an acceptable heat seal requires a force greater than 500 gm/in$^2$ (77 gm/cm$^2$) to pull apart the two films. The product of this treatment is a crosslinked EVA film containing about 35-50 percent copolymerized vinyl acetate by weight of the copolymer comprising greater than about 80 percent of the acetate groups in the film to a depth of 0.5 microns being hydrolyzed or alcoholyzed while hydrolyzing or alcoholyzing less than 80 percent of the acetate groups at depths greater than 0.5 micron.

DETAILED DESCRIPTION OF THE INVENTION

EVA containing about 35-50 percent polymerized vinyl acetate by weight is irradiated with a dosage of 0.5 to 16 MR radiation. This irradiation can of course be applied to the EVA after film formation, which is preferable, or a portion of the irradiation can be applied to the EVA before extrusion into film form, the only practical limitation being that if too much irradiation is carried out prior to film formation, the EVA will not be extrudable. With such a limitation in mind, the total irradiation dosage must be within the above stated range, i.e., 0.5 to 16 MR. Such irradiation induces the desired amount of crosslinking of the molecules of the copolymer, resulting in an elastomeric film with enhanced form stability and impact strength suitable for stretching said film over and around a food or a nonfood product. As mentioned above, this irradiation can be carried out by any of a number of conventional radiation techniques.

To remove surface tack common to this irradiated EVA film, the film is subjected to either alcoholysis, for example in a solution of sodium methoxide in methanol where the sodium methoxide concentration is greater than 15 percent by weight, or hydrolysis, for example, in a solution of potassium hydroxide in methanol where the potassium hydroxide concentration is greater than 25 percent by weight, thereby converting the acetate groups of the EVA film surface to hydroxyl groups. Alcoholic media is preferred for the alcoholyzing for two reasons. First, reagents such as NaOCH$_3$ are highly reactive with H$_2$O and hence H$_2$O interferes with the desired reaction, i.e., the conversion of acetate groups to a depth of 0.5 microns in EVA film into hydroxyl groups. Second, an aqueous medium slows the conversion of acetate groups to hydroxyl groups considerably, hence working against the object of the subject invention. For the purpose of the subject invention, the conversion of the required amount of acetate groups should be completed in well under a minute at about 25° C., hence, if an alcoholyzing or hydrolyzing reagent is used that is not highly reactive with H₂O, the process of the subject invention will tolerate the presence of up to about 15 percent H₂O in the alcoholyzing or hydrolyzing medium. Further, if the temperature of the medium is raised to about 50° C., the desired conversion can take place in well under 30 seconds. Therefore, generally speaking, if hydrolysis or alcoholysis is to be carried out without minerals being present, it is critical that the film be subjected to hydrolysis or alcoholysis for a period of time long enough to hydrolyze or alcoholyze greater than about 80 percent of the acetate groups in the film to a depth of 0.5 microns.

Further, the degree of hydrolysis or alcoholysis has an upper limit in that too much hydrolysis or alcoholysis results in the film losing its transparency upon relaxation after being stretched as well as losing its elasticity. Consequently, the hydrolysis or alcoholysis must be carried out such that at depths in the film greater than 0.5 microns less than 80 percent of the acetate groups are converted to hydroxyl groups; at 2.0 microns, only a trace amount of hydroxyl groups are found; and at 5.0 microns, essentially no conversion of acetate groups to hydroxyl groups has taken place. This treatment may be accomplished in any conventional manner which creates contact between the film and the sodium methoxide or potassium hydroxide solution. The preferred method of measuring the degree of hydrolysis or alcoholysis is optical, that is, to measure at depths specified according to ANSI/ASTM E573-76 standard recommended practices for IRS with Perkin Elmer 221 IR spectrometer, Wilks GE internal reflection element (63×19 mm, 3 mm) at 45° angle.

The contact time necessary to hydrolyze greater than 80 percent of the acetate groups in EVA film to a depth of 0.5 microns, while hydrolyzing less than 80 percent of the acetate groups at depths greater than 0.5 microns, in an approximately 25 percent by weight sodium methoxide solution in methanol is between 30 and 35 seconds at about 20° C.; less time does not sufficiently remove the film surface tack; a longer time causes the film to lose its elastic recovery and its transparency upon relaxation after being stretched. Of course, it should be pointed out that the degree of hydrolysis or alcoholysis is temperature dependent; the higher the temperature, the greater the degree of hydrolysis and vice versa.

A more detailed understanding of the possible combinations of surface treatments of EVA film in the practice of the subject invention will be found in the examples that follow.

EXAMPLE I

EVA resin containing about 42 percent copolymerized vinyl acetate by weight and a melt index of about 55 gm/10 min (ASTM D1238, 190° C.) was extruded into 4–5 min ($1 \times 10^{-2} - 1.3 \times 10^{-2}$ cm) film. The film was subjected, at ambient temperature, to 10 MR of high energy electron beam radiation and treated with 25 percent $CH_3ONa$ in $CH_3OH$ at 25° C. for the removal of surface tack, water washed and vacuum dried. The samples were folded and a 50×190×25 mm (694 g) Al weight was placed on them at ambient temperature for five minutes. The treatment times and consequent results are tabulated below:

| Time of Treatment Sec. | Surface to surface tack (g/2.5cm) (ASTM D882-756) | Stress Whitening |
|---|---|---|
| 0 | 280 | no |
| 5 | 60 | no |
| 10 | 60 | no |
| 15 | 40 | no |
| 20 | 40 | no |
| 25 | 0 | no |
| 30 | 0 | no |
| 35 | 0 | no |
| 40 | 0 | no |
| 45 | 0 | yes |
| 50 | 0 | yes |
| 55 | 0 | yes |
| 60 | 0 | yes |

Samples treated between 25–40 seconds at 25° C. showed removal of tack and no stress whitening when relaxed from 200 percent elongation. Samples treated shorter than 30 seconds showed tack and no stress whitening. Samples treated longer than 40 seconds showed no tack but whitened when released from 200 percent elongation and lost a considerable amount of elasticity.

EXAMPLE II

The procedure of Example 1 was repeated at slightly lower temperatures and the elastic recovery and transparency upon relaxation after being stretched were determined as a function of depth of greater than 80 percent hydrolysis. The results are tabulated below:

| Treat. Time Sec. | Temp. °C. | Elastic Recovery after 200% Elongation (%) | Depth of Hydro. (Est.) m | Stress Whitening |
|---|---|---|---|---|
| 18 | 23.0 | 93 | 0.06 | no |
| 22 | 22.5 | 93 | 0.14 | no |
| 26 | 22.2 | 95 | 0.09 | no |
| 30 | 22.0 | 93 | 0.33 | no |
| 34 | 21.8 | 95 | 0.34 | no |
| 38 | 21.8 | 95 | 0.54 | (surface melt fracture) no |
| 42 | 21.5 | 93 | 0.42 | no |
| 46 | 22.5 | 79 | 0.51 | yes |
| 50 | 22.0 | 81 | 0.49 | yes |
| 54 | 22.0 | 76 | 0.51 | yes |
| 58 | 22.0 | 78 | 0.54 | yes |
| 60 | 21.8 | 78 | 0.54 | yes |
| 64 | 21.8 | 77 | 0.55 | yes |

It is evident that if greater than about 80 percent hydrolysis is carried out at depths below 0.5 microns, stress whitening and loss of elastic recovery is observed.

We claim:
1. A process for treating ethylene/vinyl acetate copolymer (EVA) comprising:
   (a) providing an EVA copolymer film containing about 35 to 50 percent copolymerized vinyl acetate by weight, said film being crosslinked as a result of being subjected to a 0.5 to 16 megarad dosage of high energy radiation; and
   (b) alcoholyzing greater than 80 percent of the acetate groups in the film to depth of 0.5 microns in the film, while alcoholyzing less than 80 percent of the acetate groups at depths greater than 0.5 microns.

2. The process of claim 1 wherein the alcoholysis is carried out in a solution of greater than 15 percent by weight $CH_3ONa$ in $CH_3OH$.

3. The process of claim 2, wherein the alcoholyzing step is carried out by contacting the film with the alcoholyzing medium for less than 60 seconds.

4. The process of claim 2, wherein the alcoholyzing step is carried out by contacting the film with the alcoholyzing medium for less than 30 seconds.

5. A process for treating ethylene/vinyl acetate copolymer (EVA) comprising:
   (a) providing an EVA copolymer film containing about 35 to 50 percent copolymerized vinyl acetate by weight, said film being crosslinked as a result of being subjected to a 0.5 to 16 megarad dosage of high energy radiation; and
   (b) hydrolyzing greater than 80 percent of the acetate groups in the film to a depth of 0.5 micron in the film, while hydrolyzing less than 80 percent of the acetate groups at depths greater than 0.5 microns.

6. The process of claim 5 wherein the hydrolysis is carried out in a solution of greater than 25 percent KOH in $CH_3OH$.

7. The process of claim 6, wherein the hydrolyzing step is carried out by contacting the film with the hydrolyzing medium for less than 60 seconds.

8. The process of claim 6, wherein the hydrolyzing step is carried out by contacting the film with the hydrolyzing medium for less than 30 seconds.

9. Crosslinked ethylene/vinyl acetate copolymer film containing about 35 to 50 percent copolymerized vinyl acetate by weight of the copolymer comprising:
   greater than about 80 percent of the acetate in the film to a depth of 0.5 microns being hydrolyzed, and less than 80 percent of the acetate groups at depths greater than 0.5 microns being hydrolyzed.

10. Crosslinked ethylene/vinyl acetate copolymer film containing about 35 to 50 percent copolymerized vinyl acetate by weight of the copolymer comprising:
   greater than about 80 percent of the acetate in the film to a depth of 0.5 microns being alcoholyzed, and less than 80 percent of the acetate groups at depths greater than 0.5 microns being alcoholyzed.

* * * * *